(12) United States Patent
Appleton

(10) Patent No.: US 7,398,736 B2
(45) Date of Patent: Jul. 15, 2008

(54) BI-DIRECTIONAL CONDUIT TRAVERSING VEHICLE

(75) Inventor: Ernest Appleton, Durham (GB)

(73) Assignee: Durham Pipeline Technology Limited (GB)

( * ) Notice: Subject to any disclaimer, the term of this patent is extended or adjusted under 35 U.S.C. 154(b) by 333 days.

(21) Appl. No.: 10/535,583

(22) PCT Filed: Nov. 18, 2003

(86) PCT No.: PCT/GB03/05036

§ 371 (c)(1), (2), (4) Date: Feb. 15, 2006

(87) PCT Pub. No.: WO2004/048842

PCT Pub. Date: Jun. 10, 2004

(65) Prior Publication Data
US 2006/0150858 A1    Jul. 13, 2006

(30) Foreign Application Priority Data
Nov. 23, 2002    (GB) .................................. 0227395.1

(51) Int. Cl.
*B61B 13/10* (2006.01)
(52) U.S. Cl. .................. 104/138.2; 15/104.05; 15/104.2
(58) Field of Classification Search .............. 104/138.1, 104/138.2; 15/104.16, 104.17, 104.19, 104.2, 15/104.05
See application file for complete search history.

(56) References Cited

U.S. PATENT DOCUMENTS

| | | | |
|---|---|---|---|
| 6,431,079 B1 * | 8/2002 | Appleton et al. | 104/138.2 |
| 6,769,321 B1 * | 8/2004 | Appleton et al. | 104/138.2 |
| 6,775,872 B1 * | 8/2004 | Appleton et al. | 15/104.16 |

* cited by examiner

*Primary Examiner*—Lars A Olson
(74) *Attorney, Agent, or Firm*—Jack Schwartz & Associates, PLLC

(57) ABSTRACT

A vehicle (1) for travelling along a conduit (2) such as a pipeline having fluid flowing therein is disclosed. The vehicle comprises a first body carrying a first set of retractable bristles (12) for engaging an internal wall of the conduit such that the bristles resist movement of the first body in a first direction more than in a second direction, and a second set of retractable bristles (13) for engaging the internal wall of the conduit such that the bristles resist movement of the first body in the second direction more than in the first direction. A thread follower (16) carries a third set of resilient bristles (18) for engaging the internal wall of the conduit such that the bristles resist movement of the thread follower in the first direction more than in the second direction. A turbine (5) is actuated by fluid flow in the conduit to cause rotation of a reverse traverse screw (14) to move the first body and thread follower towards and away from each other. The first (12) and second (13) bristles are stiffer than the third bristles (18).

15 Claims, 4 Drawing Sheets

BI-DIRECTIONAL CONDUIT TRAVERSING VEHICLE

The present invention relates to vehicles for travelling along conduits having fluid flowing therein, and relates particularly, but not exclusively, to vehicles for travelling along liquid transportation pipelines having liquid flowing therein.

In many industries, particularly the oil and gas industry, it is desirable to have vehicles that can travel through pipelines to perform functions such as maintenance, repair and cleaning. Vehicles that are propelled in the direction of the fluid flow are well known, and in the applicant's concurrent International Patent Application No PCT/GB00/03614, a vehicle is described that is able to drive itself in the direction opposite to that of the fluid flow by deriving the energy to do so from the opposing fluid flow itself.

The vehicle described in PCT/GB00/03614 propels itself by having bodies provided with bristles which engage the conduit walls, and moves against the fluid flow using a turbine to power a reciprocating motion of the bodies towards and away from each other. This allows the vehicle to move against the fluid for an indefinite amount of time. This feature is useful in that the vehicle does not have to be connected to an umbilical power cable and can therefore travel through pipes of far greater length than in prior art vehicles. To retrieve the vehicle, a parachute is deployed and the drag of the fluid pulls the vehicle back to its starting point.

The vehicle described in PCT/GB00/03614 suffers from the drawback that when it has moved past a certain point of interest in the pipeline, it will not effectively pass that point again until the vehicle is being retrieved. However, the vehicle is generally retrieved at such high velocity that it does not spend any significant time at the point of interest. This can be a problem for example, when the vehicle is performing a scanning function. The outward journey time for a vehicle of this type can be of the order of several weeks, and if the pipeline is being scanned for structural defects, the useful data may be taken in a single period of the order of a few seconds. It is highly desirable therefore to be able to re-scan sections of the pipeline, and as a consequence move in the reverse direction without fully retrieving the vehicle, repeating this action with further backwards and forwards motion if necessary.

WO 02/42601 discloses a bi-directional traction apparatus in which flow of fluid past a turbine causes rotation of a drive shaft, which in turn causes resilient arms of traction members to be oscillated or swashed backwards and forwards to move the apparatus along a pipeline. The traction members are inclined relative to the drive shaft, and in order to reverse the direction of movement of the apparatus, it is necessary to displace to traction members along hubs on which they are mounted, so that rotation of the traction members causes them to oscillate 180 degrees out of phase with their previous position.

This arrangement suffers from the drawback that such direction-reversing mechanisms are difficult to accommodate in the limited space available on the apparatus, especially when mounted to a body of which a significant part of the internal space is occupied by a drive shaft. In addition, this prior art apparatus is recovered from the pipeline by deploying means such as a parachute to cause the apparatus to be carried out of the pipeline by fluid flow. This will occur while the elastomeric arms of the traction members are in contact with the pipeline wall, as a result of which damage may occur to the elastomeric arms, unless complicated apparatus for retracting the arms from the pipeline wall are available.

Preferred embodiments of the present invention seek to overcome the disadvantages of the prior art.

According to the present invention, there is provided a vehicle for travelling along a conduit having fluid flowing therein, the vehicle comprising:

at least one first body portion;

a plurality of first retractable resilient members mounted to said body portion and adapted to engage an internal wall of a conduit such that said first resilient members resist movement of the apparatus along a conduit in a first direction more than in a second direction opposite to said first direction;

a plurality of second retractable resilient members mounted to said body portion and adapted to engage the internal wall of the conduit such that said second resilient members resist movement of the apparatus along the conduit in said second direction more than in said first direction;

at least one second body portion having a respective plurality of third resilient members adapted to engage the internal wall of the conduit such that said third resilient members resist movement of the second body portion relative to the conduit in one of said first or second direction more than in the other of said first or second direction; and moving means for moving said first body portion and the or each said second body portion towards and away from each other;

wherein said first and second resilient members are stiffer than said third resilient members.

By providing a vehicle in which two sets of resilient members providing greater resistance to movement in opposite directions are selectively deployable against the wall of the conduit, this provides the advantage that the conduit traversing vehicle can be made to travel in both directions along the conduit, allowing regions of interest to be re-visited. For example, by providing two sets of retractably mounted bristles, pre-inclined in opposite directions with respect to the length of the pipeline, the direction of movement of the vehicle can be chosen by retracting one of the sets of resilient bristles. In addition, by providing first and second resilient members which are stiffer than the third resilient members, this provides the advantage of allowing the direction of inclination of the third resilient member to be reversed by simply reversing the direction of travel of the vehicle, if the third members are sufficiently flexible. This is particularly advantageous because of the limited space available on the vehicle, which makes it difficult to accommodate a mechanism on the second body portion for reversing the direction of inclination of the third resilient members. This also enables the vehicle to be constructed in such a way that when the first or second resilient members engage the conduit and the direction of inclination of the third resilient members is reversed, so that the vehicle is arranged to propel itself in the direction of fluid flow in the conduit, the frictional resistance between the resilient members and the conduit wall can be minimised, thus minimising the risk of damage to the resilient members.

Preferably, a plurality of said first and/or second resilient members are bristles.

In a preferred embodiment, the vehicle further comprises cam means provided on said body portion for retracting said first and/or second resilient members.

The cam means may comprise first support means for a plurality of said first resilient members, second support means for a plurality of said second resilient members, and displacement means for causing radial displacement of said first and/or second support means relative to the body portion.

In a preferred embodiment, the displacement means comprises at least one displacement member axially moveable relative to the first body portion and having a respective mating surface for engaging a corresponding surface on at least one said first and/or second support means such that axial movement of the or each said displacement member causes radial displacement of the or each said first or second support means.

At least one said displacement member may be axially displaceable relative to the first body portion.

At least one said displacement member may be rotatable relative to the first body portion.

At least one said second body portion may be slidably mounted to a shaft connected to said first body portion.

The moving means may comprise at least one screw thread on said shaft and rotating means for rotating the shaft relative to at least one said second body portion.

The vehicle may further comprise drive means for operating said moving means.

In a preferred embodiment the drive means has at least one shaft portion adapted to be rotated by the fluid flow.

The drive means may be electrically operated.

The drive means may be rechargeable through rotation of at least one said shaft portion.

This has the advantage that an electrical drive means can be recharged using energy derived from the fluid flow.

A vehicle may further comprise deployable means for increasing fluid drag on the vehicle.

The deployable means may be a parachute.

This provides the advantage of allowing the vehicle to be pulled along the conduit with the fluid flow, in order to assist recovery of the vehicle.

As an aid to understanding the present invention, a preferred embodiment thereof will now be described, by way of example only and not in any limitative sense, with reference to the accompanying drawings, in which:

FIG. 2 is a cross sectional view along the line A-A in FIG. 1a.

Figure 1A:
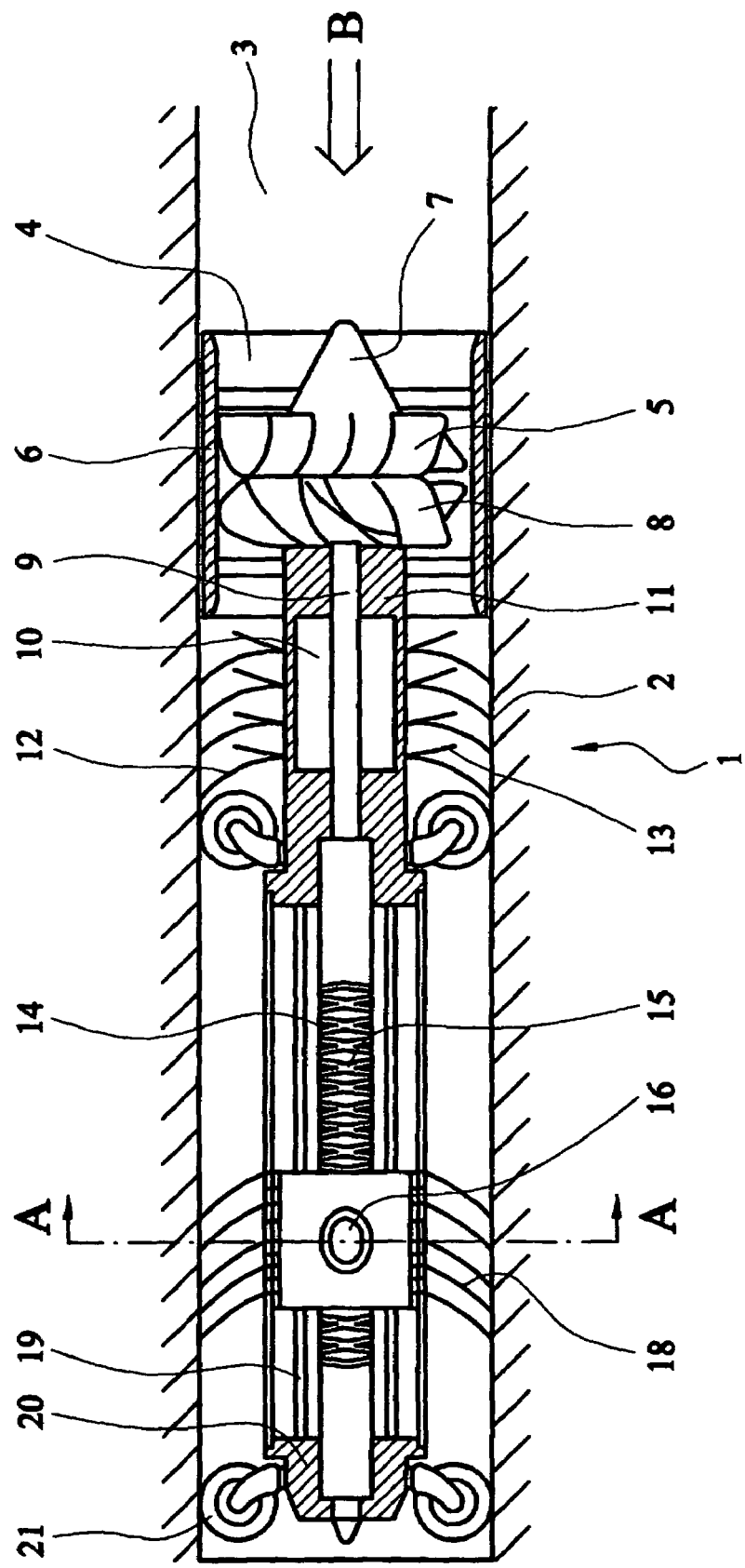
FIG. 1a is a schematic cross-sectional view of a conduit traversing vehicle embodying the present invention with the first set of retractable bristles thereof engaging a conduit surface.

Referring to FIG. 1a, a vehicle 1 for travelling along a conduit 2, such as a pipeline having a fluid 3 such as oil flowing therein in the direction of arrow B, comprises a drive means 4 having a turbine 5 located within a housing 6. The turbine 5 has a stator 7 and a rotor 8 connected to a shaft 9 via a gearbox 10 such that movement of fluid 3 in the direction of arrow B causes rotation of the rotor 8 which in turn causes rotation of the shaft 9.

A conduit gripping apparatus 11 is connected to the drive means 4 such that the shaft 9 can rotate relative to the conduit gripping apparatus 11. The conduit gripping apparatus 11 has a first body and carries a first set of pre-inclined retractable resilient bristles 12 and a second set of pre-inclined retractable resilient bristles 13 inclined in the opposite direction to bristles 12. In FIG. 1a, the first set of retractable resilient bristles 12 is shown in the deployed position, and the second set of retractable resilient bristles is shown in the retracted position. The conduit gripping apparatus 11 with the retractable resilient bristles 12 and 13 has an external diameter slightly greater than the internal diameter of the conduit 2 so that when in the deployed position, as demonstrated in FIG. 1a, each set of retractable resilient bristles 12, 13 engages the surface of the pipeline 2.

A reverse traverse screw 14 is connected to the shaft 9 and has two sets of helically extending cam grooves 15 in its surface which mate with a thread follower 16 supported by a nut 17 carrying a third set of resilient bristles 18 which are less stiff than the first and second sets of retractable resilient bristles 12 and 13. The nut 17 is mounted to a guide 19 which is in turn connected to a housing 20 carrying the end of reverse traverse screw 14 remote from the drive means 4. Rotation of the shaft 9 causes rotation of the reverse traverse screw 14, which through engagement of the thread follower 16 in cam grooves 15, causes axial movement of the nut 17 along guides 19 relative to the conduit gripping apparatus 11. The housing 20 contains a bearing, and is provided with a set of wheels 21 for engaging the internal surface of the pipeline 2.

Figure 2:
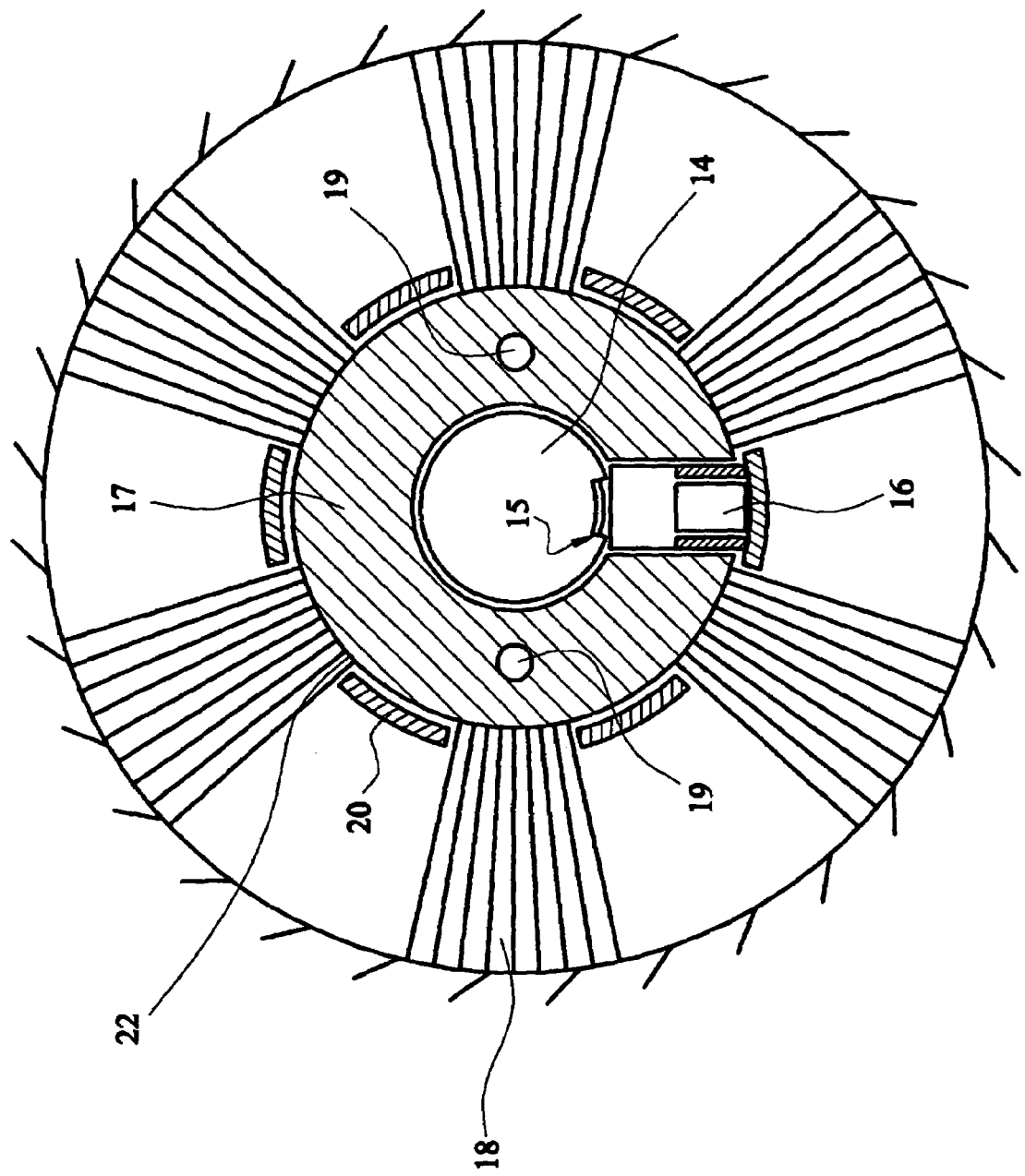

FIG. 2 shows a cross sectional view along the line A-A in FIG. 1a. The nut 17 carries thread follower 16 which engages one of the grooves 15 on the reverse traverse screw 14, and the nut 17 is adapted to slide along the guides 19 located within the housing 20. The third set of resilient bristles 18 projects through elongate slots 22 in the housing 20.

The operation of the vehicle 1 described with reference to FIGS. 1a, 1b, 1c and 2 will now be described.

Referring specifically to FIG. 1a, fluid flows in the direction of arrow B and movement of fluid through the stator 7 causes the turbine rotor 8 to rotate, which in turn causes rotation of the shaft 9. This in turn causes rotation of the reverse traverse screw 14, as a result of which the thread follower 16 engages a first one of the cam grooves 15 and causes the nut 17 to slide longitudinally relative to the conduit gripping apparatus 11. This causes the first set of retractable resilient bristles 12 and the third set of resilient bristles 18 to be moved away from each other.

Because the bristles 12, 18 are oriented backwards relative to the direction of travel of the vehicle, the frictional force of the bristles 12, 18 against the wall of the pipe 2 is greater in the rearward direction than in the forward direction. Accordingly, the rear bristles 18 do not move or move very little relative to the wall of the conduit 2, whereas the forward retractable resilient bristles 12 and the conduit gripping apparatus 11 are urged forwards.

As the nut 17 reaches the end of its travel along the cam groove 15 of the reverse traverse screw 14, the thread follower 16 is so shaped that it is forced to engage the other cam groove 15 and is caused to move in the opposite direction relative to the reverse traverse screw 14. As a result, the third set of bristles 18 and the first set of retractable bristles are moved towards each other. The first set of retractable bristles 12 has greater resistance to moving backwards than the third set of bristles 18 has to moving forwards, so the first set of retractable bristles 12 and the conduit gripping apparatus 11 remain stationary, or move very little relative to the pipe wall 2, and the third set of bristles 18 is moved forwards until the nut 17 reaches the forward end of its travel along the reverse traverse screw 14. The process then repeats itself, and the vehicle 1 travels along the pipe 2 in the direction opposite to that of the fluid flow shown by arrow B.

Figure 1B:
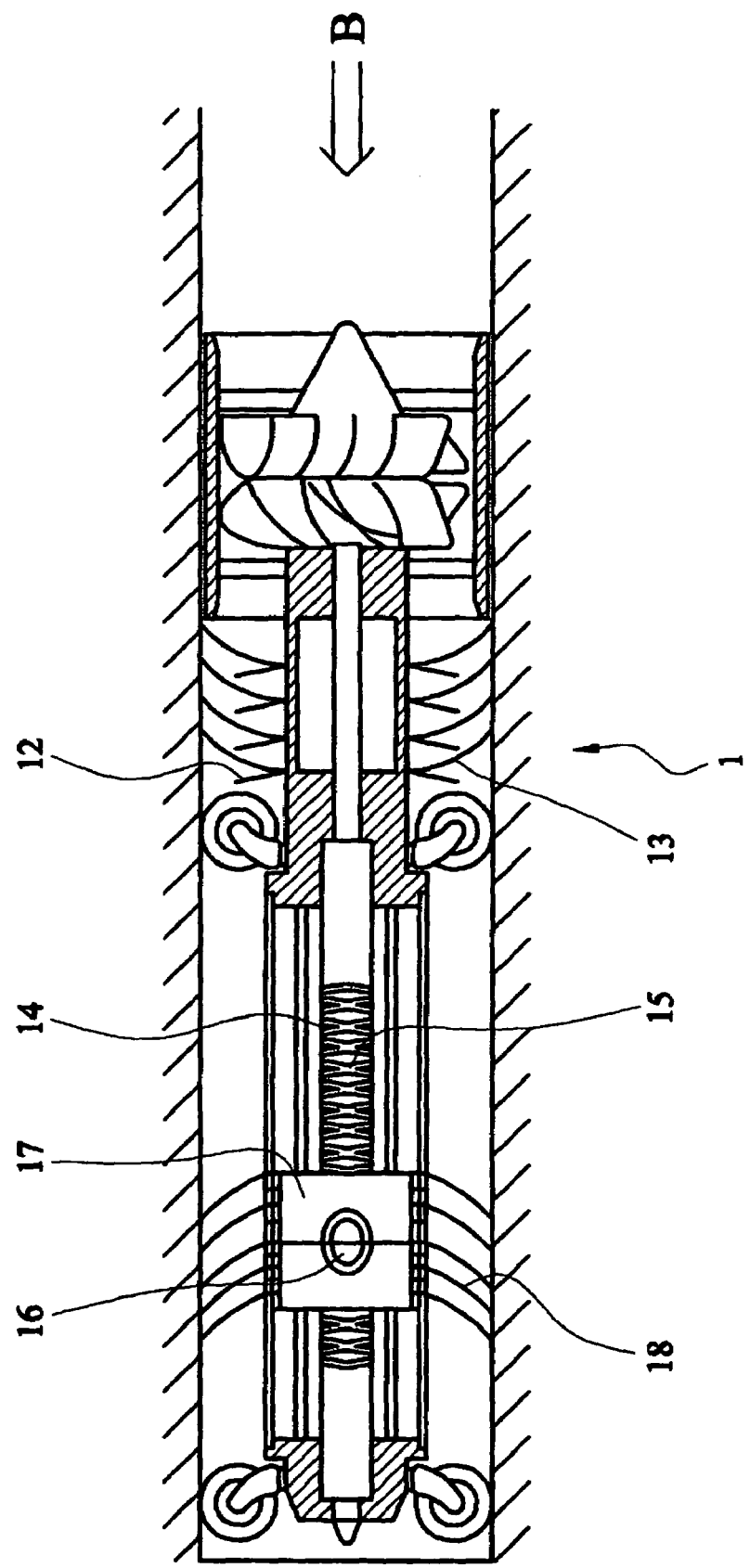
FIG. 1b is a schematic view, corresponding to FIG. 1a, in which the second set of retractable bristles engage the conduit surface.

Referring now specifically to FIG. 1b, in order to reverse the direction of travel of the vehicle, it is necessary to reverse the inclination of the bristles with respect to the pipeline 2. The conduit gripping apparatus contains one or more cam members (not shown) to retract the first set of retractable bristles 12 and also deploy the second set of retractable bristles 13. The first and second sets of bristles are supported on carriers (not shown) which selectively engage the cam members as the cam members rotate and/or move axially relative to the first body to deploy the first set of bristles and retract the second set of bristles in one position of the cam members, and retract the first set of bristles and deploy the second set of bristles in the other position of the cam members As the second set of retractable bristles 13 is pre-inclined in the opposite direction to the first set of retractable bristles 12, they engage the internal surface of the pipeline 2 in the opposite direction to the first set of retractable bristles 12.

If the nut 17 is in the phase of its motion in which it is moving along traverse reverse screw 14 towards the conduit gripping apparatus 11 and away from the housing 20, neither second set of retractable bristles 13 nor third set of bristles 18 is oriented in a manner to resist the motion by virtue of the frictional force imparted to the pipeline 2. Accordingly, the third set of bristles will move towards the second set of retractable bristles and the vehicle will remain stationary. However, when the nut reaches the end of its travel along the cam groove 15 of the reverse traverse screw 14, the thread follower 16 will engage the other cam groove and urge the nut 17 to move in the direction away from the conduit gripping apparatus 11.

In this position, both sets of bristles 13, 18 are oriented in a manner to resist motion relative to the pipeline 2. Since the second set of retractable bristles 13 is stiffer than the third set of bristles 18, and both sets 13 and 18 are inclined to oppose the pipeline 2, the third set of bristles 18 will be forced to flip over and change its inclination with respect to the pipeline 2.

Figure 1C:
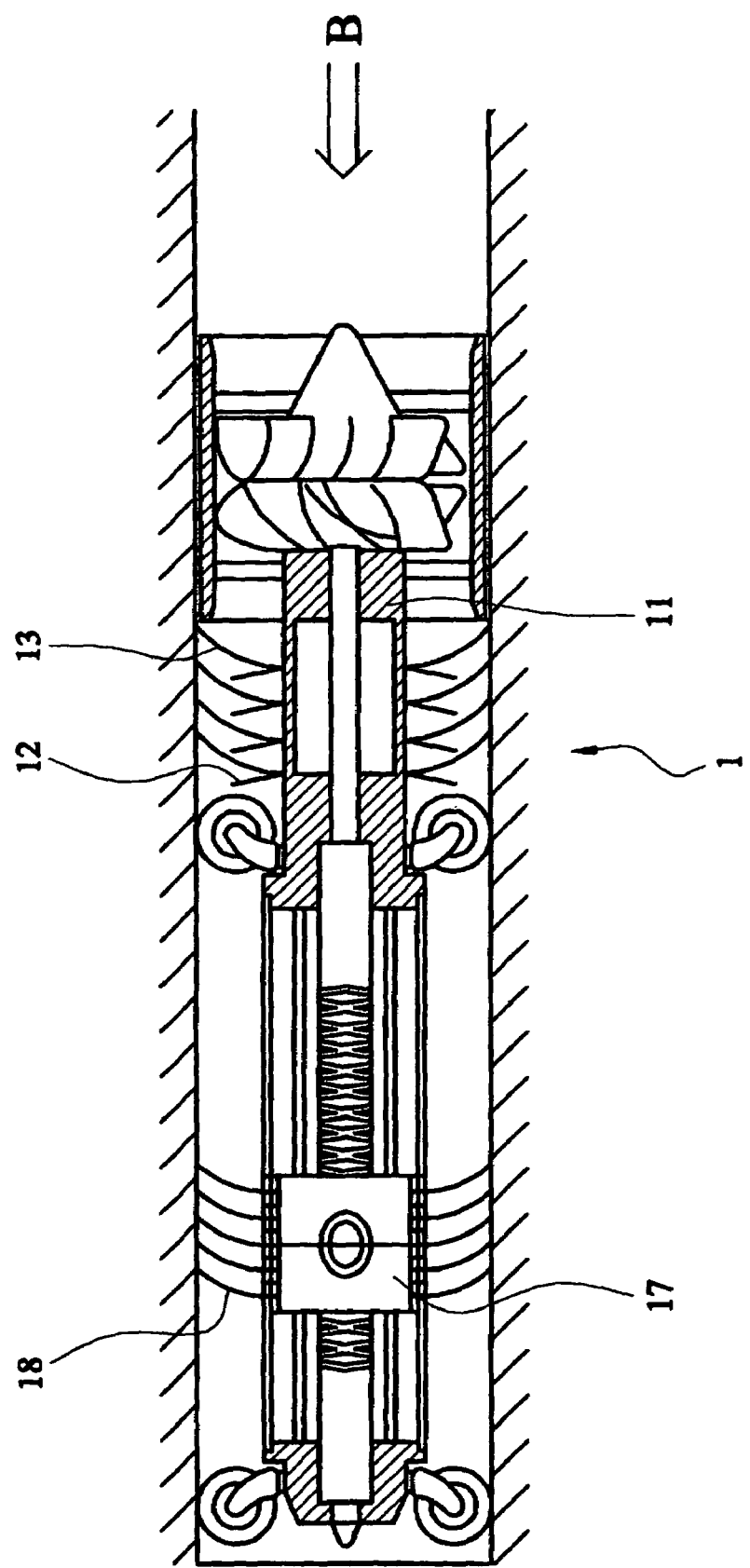
FIG. 1c is a schematic view, corresponding to FIG. 1b, in which the direction of travel of the vehicle has been reversed.

The second set of retractable bristles 13, and the third set of bristles 18 will now be in the configuration shown in FIG. 1c. It will be appreciated that this is the opposite configuration to that shown in FIG. 1a and accordingly, the vehicle 1 will now move in the direction of the flow shown by arrow B, by the same process as that of the vehicle 1 shown in the configuration of FIG. 1a.

The direction of travel of the vehicle 1 can again be reversed, by using the cam means (not shown) in the conduit gripping apparatus 11 to retract the second set of retractable bristles 13 and deploy the first set of retractable bristles 12, which will in turn force reversal of inclination of third set of bristles 18. In this way, it can be seen that the direction of movement of the vehicle can be easily reversed, without the necessity to provide a mechanism on the nut 17 for reversing the direction of inclination of the third set of bristles 18.

It will be appreciated by persons skilled in the art that the above embodiment has been described by way of example only and not in any limitative sense, and that various alterations and modifications are possible without departure from the scope of the invention as defined by the appended claims.

The invention claimed is:

1. A vehicle for traveling along a conduit having fluid flowing therein, the vehicle comprising:
    at least one first body portion;
    a plurality of first retractable resilient members mounted to said body portion and adapted to engage an internal wall of a conduit such that said first resilient members resist movement of the vehicle along a conduit in a first direction more than in a second direction opposite to said first direction;
    a plurality of second retractable resilient members mounted to said body portion and adapted to engage the internal wall of the conduit such that said second resilient members resist movement of the vehicle along the conduit in said second direction more than in said first direction;
    at least one second body portion having a respective plurality of third resilient members adapted to engage the internal wall of the conduit such that said third resilient members resist movement of the second body portion relative to the conduit in one of said first or second direction more than in the other of said first or second direction; and
    at least one moving device for moving said first body portion and the or each said second body portion towards and away from each other;
    wherein said first and second resilient members are stiffer than said third resilient members.

2. A vehicle according to claim 1, wherein a plurality of said first and/or second and/or third resilient members are bristles.

3. A vehicle according to claim 1, further comprising at least one cam provided on said first body portion for retracting said first and/or second resilient members.

4. A vehicle according to claim 3 wherein at least one said cam comprises at least one first support for a plurality of said first resilient members, at least one second support for a plurality of said second resilient members, and at least one displacement device for causing radial displacement of the or each said first and/or second support relative to said first body portion.

5. A vehicle according to claim 4, wherein at least one said displacement device comprises at least one displacement member axially moveable relative to the first body portion and having a respective mating surface for engaging a corresponding surface on at least one said first and/or second support such that movement of the or each said displacement member causes radial displacement of the or each said first or second support.

6. A vehicle according to claim 5, wherein at least one said displacement member is axially displaceable relative to the first body portion.

7. A vehicle according to claim 5, wherein at least one said displacement member is rotatable relative to the first body portion.

8. A vehicle according to claim 1, wherein at least one said second body portion is slidably mounted to a shaft connected to said first body portion.

9. A vehicle according to claim 8 wherein at least one said moving device comprises at least one screw thread on said shaft and at least one rotating device for rotating the shaft relative to at least one said second body portion.

10. A vehicle according to claim 1, further comprising at least one drive apparatus for operating the or each said moving device.

11. A vehicle according to claim 10, wherein at least one said drive apparatus has at least one shaft portion adapted to be rotated by the fluid flow.

12. A vehicle according to claims 10, wherein at least one said drive apparatus is electrically operated.

13. A vehicle according to claim 11, wherein at least one said drive apparatus is rechargeable through rotation of at least one said shaft portion.

14. A vehicle according to claim 1, further comprising at least one deployable device for increasing fluid drag on the vehicle.

15. A vehicle according to claim 14, wherein at least one said deployable device is a parachute.

* * * * *